United States Patent [19]
Ishihara et al.

[11] Patent Number: 6,137,222
[45] Date of Patent: Oct. 24, 2000

[54] MULTI-COLOR ELECTROLUMINESCENT DISPLAY PANEL

[75] Inventors: Hajime Ishihara; Tomoya Uchida, both of Kariya; Yutaka Hattori, Okazaki; Kazuhiro Inoguchi, Toyota, all of Japan

[73] Assignee: Denso Corporation, Kariya, Japan

[21] Appl. No.: 09/098,958

[22] Filed: Jun. 17, 1998

[30] Foreign Application Priority Data

Jun. 17, 1997 [JP] Japan ................................... 9-160293
May 27, 1998 [JP] Japan ................................. 10-146236

[51] Int. Cl.$^7$ ............................ H05B 33/14; H05B 33/26
[52] U.S. Cl. ........................ 313/506; 313/500; 313/509
[58] Field of Search ................................. 313/500, 504, 313/506, 509

[56] References Cited

U.S. PATENT DOCUMENTS

| | | | |
|---|---|---|---|
| 4,924,144 | 5/1990 | Menn et al. | 313/500 |
| 5,156,924 | 10/1992 | Taniguchi et al. | 313/506 |
| 5,693,428 | 12/1997 | Fujii et al. | 313/504 |
| 5,932,327 | 8/1999 | Inoguchi et al. | 313/500 |

FOREIGN PATENT DOCUMENTS

| | | | |
|---|---|---|---|
| 58-28194 | 2/1983 | Japan | H05B 33/08 |
| 58-30093 | 2/1983 | Japan | H05B 33/12 |
| 63-274090 | 11/1983 | Japan | H05B 33/12 |
| 58-223292 | 12/1983 | Japan | H05B 33/18 |
| 9-97677 | 4/1997 | Japan | H05B 33/14 |

*Primary Examiner*—Michael H. Day
*Attorney, Agent, or Firm*—Pillsbury Madison & Sutro LLP

[57] ABSTRACT

An electroluminescent display panel which is able to selectively display different colors by changing a voltage level imposed thereon is made in a simple structure. A first luminescent layer (4) emitting green light, for example, and a second luminescent layer (5) emitting orange light, for example, are directly laminated on each other without interposing an intermediate electrode therebetween. The second luminescent layer covers only a part of the first luminescent layer to form a single layer portion and a double layer portion. The single layer portion emits green light at a low voltage level, while the double layer portion emits lemon light having a higher luminance at a high voltage level. The display may be made in a form of a matrix or a certain pattern. The display panel may be used as an instrument panel for an automobile. The green light display is used at night time, while the lemon light display with a high luminance is used at day time to cope with sun light.

10 Claims, 5 Drawing Sheets

MULTI-COLOR ELECTROLUMINESCENT DISPLAY PANEL

CROSS-REFERENCE TO RELATED APPLICATIONS

This application is based upon and claims benefit of priority of Japanese Patent Applications No. Hei-9-160293 filed on Jun. 17, 1997 and No. Hei-10-146236 filed on May 27, 1998, the contents of which are incorporated herein by reference.

BACKGROUND OF THE INVENTION

1. Field of the Invention

The present invention relates to an electroluminescent display panel, and more particularly to the one which is able to display images in different colors according to situations where the display is used.

2. Description of Related Art

An example of the electroluminescent display panel of this kind is disclosed in JP-A-58-30093. In this display panel, a first luminescent layer of $ZnS:TbF_3$ for displaying images in green and a second luminescent layer of $ZnS:SmF_3$ for displaying images in red are laminated, with an insulation layer and an intermediate electrode disposed therebetween. When voltage is imposed on only the first luminescent layer, images are displayed in green, when voltage is imposed on only the second luminescent layer, images are displayed in red, and when voltage is imposed on both luminescent layers, images are displayed in a lemon color which is a mixture of green and red.

This kind of display panel is suitable for use as an instrument panel for an automobile, which is able to display images in different colors in day time and in night time. Generally, it is desired to display images with a high luminance in day time, while it is desired not to display images in colors which include red in night time because red is a warning color and a driver feels uneasy with it. The display panel disclosed in the publication above is able to display images in red or lemon with a high luminance in day time by imposing voltage on both first and second luminescent layers, and to display images in green in night time by imposing voltage only on the first luminescent layer. Thus, the display panel fulfills the general requirement. However, it is necessary to provide an intermediate electrode between the first and second luminescent layers. The intermediate electrode makes the structure complex, and accordingly the display panel becomes expensive.

SUMMARY OF THE INVENTION

The present invention has been made in view of the above-mentioned problem, and an object of the present invention is to provide an electroluminescent display panel which is able to display different colors according to the situations without using the intermediate electrode. Another object of the present invention is to provide such a panel in which images are able to be selectively displayed in a color including no visible red components or in a color including visible red components with a high luminance.

The electroluminescent display panel according to the present invention is composed of various layers laminated on a glass substrate. A first electrode layer, a first insulation layer, a first luminescent layer, a second luminescent layer, a second insulation layer and a second electrode layer are all laminated in this order on the glass substrate. The first and second electrode layers are for med into plural elongate stripes. The plural stripes of the first electrode layer are disposed perpendicularly to the plural stripes of the second electrode layer, so that cross-sections of the electrode stripes form a matrix. Each cross-section forms a picture element. Alternatively, both electrode layers are formed into patterns to be suitable for a pattern display.

The first luminescent layer is made of a material which emits light including no visible red light components, and the second luminescent layer laminated on the first luminescent layer to cover a part thereof is made of a material which emits light including visible red light components. Preferably, the first luminescent layer is made of ZnS:Tb or ZnS:TbOF which emits green light, and the second luminescent layer is made of ZnS:Mn which emits orange light. The second luminescent layer partly overlaps the first luminescent layer, thereby forming a single layer portion and a double layer portion. The single layer portion emits green light at a low level voltage and the double layer portion emits lemon light which is a mixture of green and orange at a high level voltage.

When the display panel is used as an instrument panel for an automobile, the green light display is used at night time and the lemon light display is used at day time. The green light is comfortable for a driver especially at night time, and the lemon light has a high luminance to cope with sun light at day time.

Alternatively, the second luminescent layer may be eliminated, and, instead, a color filter such as a red color filter may be disposed to cover a part of the first luminescent layer. In this case, green light is emitted at a low voltage, and yellow light which is a mixed color of green and red is emitted at a high voltage.

The electroluminescent display panel which is able to display different colors simply by changing the voltage level can be made in a simple structure and at a low cost.

Other objects and features of the present invention will become more readily apparent from a better understanding of the preferred embodiments described below with reference to the following drawings.

DETAILED DESCRIPTION OF THE PREFERRED EMBODIMENTS

Figure 1:
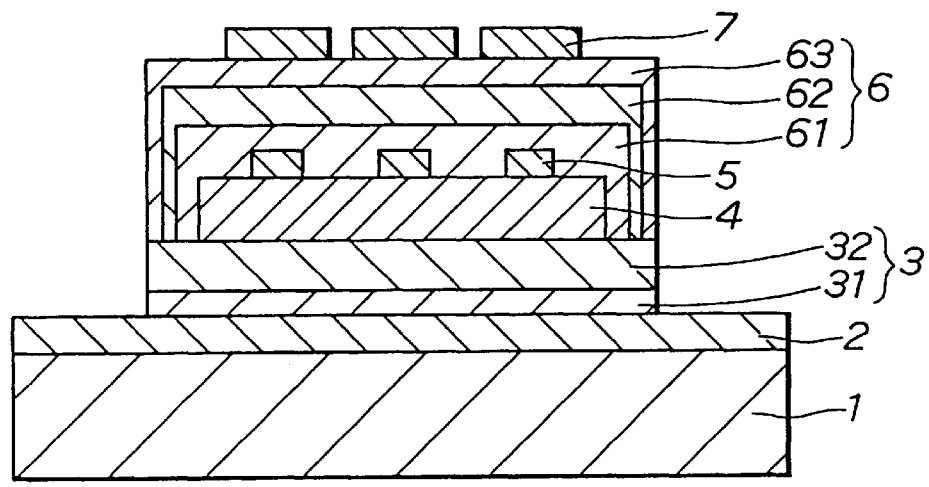
FIG. 1 is a cross-sectional view schematically showing an electroluminescent display panel as a first embodiment of the present invention, taken along a line I—I in FIG. 2.
Figure 2:
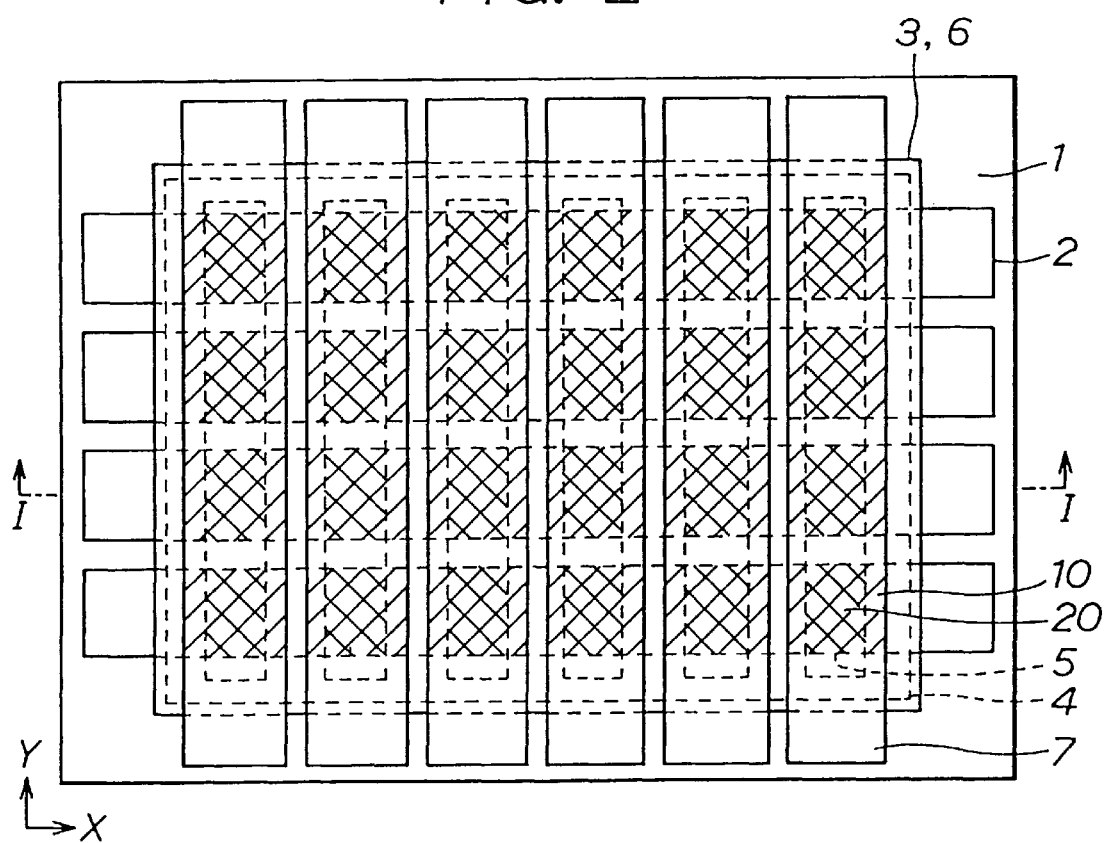
FIG. 2 is a plan view showing the display panel shown in FIG. 1.

An electroluminescent display panel as a first embodiment of the present invention will be described, referring to FIGS. 1 to 5. As shown in FIGS. 1 and 2, various layers constituting the display panel are laminated on a glass substrate 1. On the glass substrate 1, first electrodes 2 made of ITO having a thickness of 200 nm are formed. The first electrodes 2 are a plurality of stripes each extending in the X-axis direction as shown in FIG. 2. On the first electrodes 2, a first insulation layer 3 is formed. The first insulation layer 3 consists of a lower layer 31 made of $SiO_xN_y$ having a thickness of 50–100 nm and a upper layer 32 which is a compound layer made of $Ta_2O_3$ and $Al_2O_3$ having a thickness of 200–300 nm. Both of the lower and upper layers 31, 32 are optically transparent. On the upper layer 32 of the insulation layer 3, a first luminescent layer 4 and a second luminescent layer 5 are formed. As shown in FIG. 2, the first luminescent layer 4 is uniformly formed as a single layer, while the second luminescent layer 5 is a plurality of stripes extending in the Y-axis direction. The width of the second luminescent layer 5 is about a half of the width of second electrodes 7.

The first luminescent layer 4 is made of TbOF-added ZnS and has a thickness of 600 nm. The second luminescent layer 5 is made of Mn-added ZnS and has a thickness of 400 nm. On the first and second luminescent layers 4, 5, a second insulation layer 6 is formed to cover the luminescent layers. The second insulation layer 6 consists of three layers, a lower layer 61, a middle layer 62 and an upper layer 63. The lower layer 61 is made of $Si_3N_4$ having a thickness of 100 nm. The middle layer 62 is a compound layer made of $Ta_2O_5$ and $Al_2O_3$ having a thickness of 200 nm. The upper layer 63 is made of $SiO_xN_y$ having a thickness of 100 nm. All the materials of the second insulation layers are optically transparent. On the upper layer 63 of the second insulation layer 6, second electrodes 7 made of optically transparent ZnO and $Ga_2O_3$ having a thickness of 450 nm are formed. The second electrodes 7 are a plurality of stripes extending in the Y-axis direction as shown in FIG. 2. The second electrodes 7 and the first electrodes 2 extending in the X-axis direction form a picture element or pixel matrix, each element of which is located at each crossing point of both electrodes 2, 7.

As shown in FIG. 2, the first and second luminescent layers 4, 5 form a single layer portion 10 and a double layer portion 20. The single layer portion 10 is constituted by only the first luminescent layer 4, while the double layer portion 20 is constituted by both of the first and second luminescent layers 4, 5. The single layer portion 10 and the double layer portion 20 are aligned side by side as seen in FIG. 2.

The threshold voltage with which the luminescent layers 4, 5 begin to emit light is determined depending on the layer thickness and properties of the material used. The threshold voltage VthS for the single layer portion 10 and the threshold voltage VthD for the double layer portion 20 are expressed in the following formulae.

$$VthS = Ea1\{ta1 + ti \cdot (\in a1/\in i)\} \quad (1)$$

$$VthD = Ea1 \cdot ta1 + Ea2 \cdot \{ta2 + ti \cdot (\in a2/\in i)\} \quad (2)$$

where:

Ea1: clamp electric field intensity of the first luminescent layer 4;

ta1: thickness of the first luminescent layer 4;

$\in a1$: relative dielectric constant of the first luminescent layer 4;

Ea2: clamp electric field intensity of the second luminescent layer 5;

ta2: thickness of the second luminescent layer 5;

$\in a2$: relative dielectric constant of the second luminescent layer 5;

ti: thickness of the insulation layer;

$\in i$: relative dielectric constant of the insulation layer;

As seen from the formulae, the threshold voltage VthS of the single layer portion 10 increases as the first luminescent layer 4 becomes thicker, and the threshold voltage of the double layer portion 20 increases as both of the first and second luminescent layers 4, 5 become thicker. The difference between both threshold voltages is expressed as follows:

$$VthD - VthS = Ea2 \cdot ta2 + (\in a2 \cdot Ea2 - \in a1 \cdot Ea1) \cdot (ti/\in i) \quad (3)$$

If the first and second luminescent layers 4, 5 are designed so that $(\in a2 \cdot Ea2 - \in a1 \cdot Ea1) \geq 0$, then the threshold voltage difference (VthD−VthS) is always positive and becomes larger as the thickness of the second luminescent layer becomes thicker. If the first and second luminescent layers 4, 5 are designed so that $(\in a2 \cdot Ea2 - \in a1 \cdot Ea1) < 0$, then the threshold voltage difference (VthD−VthS) is positive only if the following relation exist:

$$Ea2 \cdot ta2 > (\in a1 \cdot Ea1 - \in a2 \cdot Ea2) \cdot (ti/\in i),$$

that is, $$ta2 > (\in a1 \cdot Ea1 - \in a2 \cdot Ea2) \cdot (ti/\in i)/Ea2$$

The thickness ti of the insulation layer in the formulae above is a total thickness of all the insulation layers 31, 32, 61, 62 and 63, when the same material is used for all of them. On the other hand, if respectively different materials are used, the value $ti/\in i$ is expressed as follows:

$$(ti/\in i) = \Sigma(ti_n/\in i_n)$$

where $ti_n$ is a thickness of respective insulation layers, and $\in i_n$ is a relative dielectric constant of respective insulation layers.

The respective values Ea1, ta1, $\in a1$, Ea2, ta2, $\in a2$, $ti_n$ and $\in i_n$ in the embodiment described above and shown in FIGS. 1 and 2 are as follows:

Ea1 (clamp electric field intensity of the first luminescent layer 4): about 1.8 [MV/cm];

ta1 (thickness of the first luminescent layer 4): 600 [nm];

$\in a1$ (dielectric constant of the first luminescent layer 4): about 9.0;

Ea2 (clamp electric field intensity of the second luminescent layer 5): about 1.7 [MV/cm];

ta2 (thickness of the second luminescent layer 5): 400 [nm]

$\in a2$ (dielectric constant of the second luminescent layer): about 10.0;

$ti_1$ (thickness of the insulation layer 31): 100 [nm];

$ti_2$ (thickness of the insulation layer 32): 300 [nm];

$\in i_1$ (dielectric constant of the layer 31): about 7.6;

$\in i_2$ (dielectric constant of the layer 32): about 27.0;

$ti_3$ (thickness of the insulation layer 61): 100 [nm];

$ti_4$ (thickness of the insulation layer 62): 200 [nm];

$ti_5$ (thickness of the insulation layer 63): 100 [nm];

$\in i_3$ (dielectric constant of the layer 61): about 8.0;

∈i₄ (dielectric constant of the layer 62): about 27.0; and
∈i₅ (dielectric constant of the layer 63): about 7.6
Accordingly, the value (ti/∈i) is calculated as follows:

(ti/∈i)=100/7.6+300/27+100/8.0+200/27+100/7.6≈57.3

The threshold voltage VthS of the single layer portion 10 is calculated according to the formula (1):

VthS=1.8[MV/cm]×(600[nm]+9.0×57.3[nm])=200.8[V]

The threshold voltage VthD of the double layer portion 20 is calculated according to the formula (2):

VthD=1.8[MV/cm]×600[nm]+1.7[MV]×(400[nm]+10.0×57.3[nm])=273.4[V]

Therefore, the difference between both threshold voltages is:

VthD−VthS=273.4[V]−200.8[V]=72.6[V]

Figure 3:
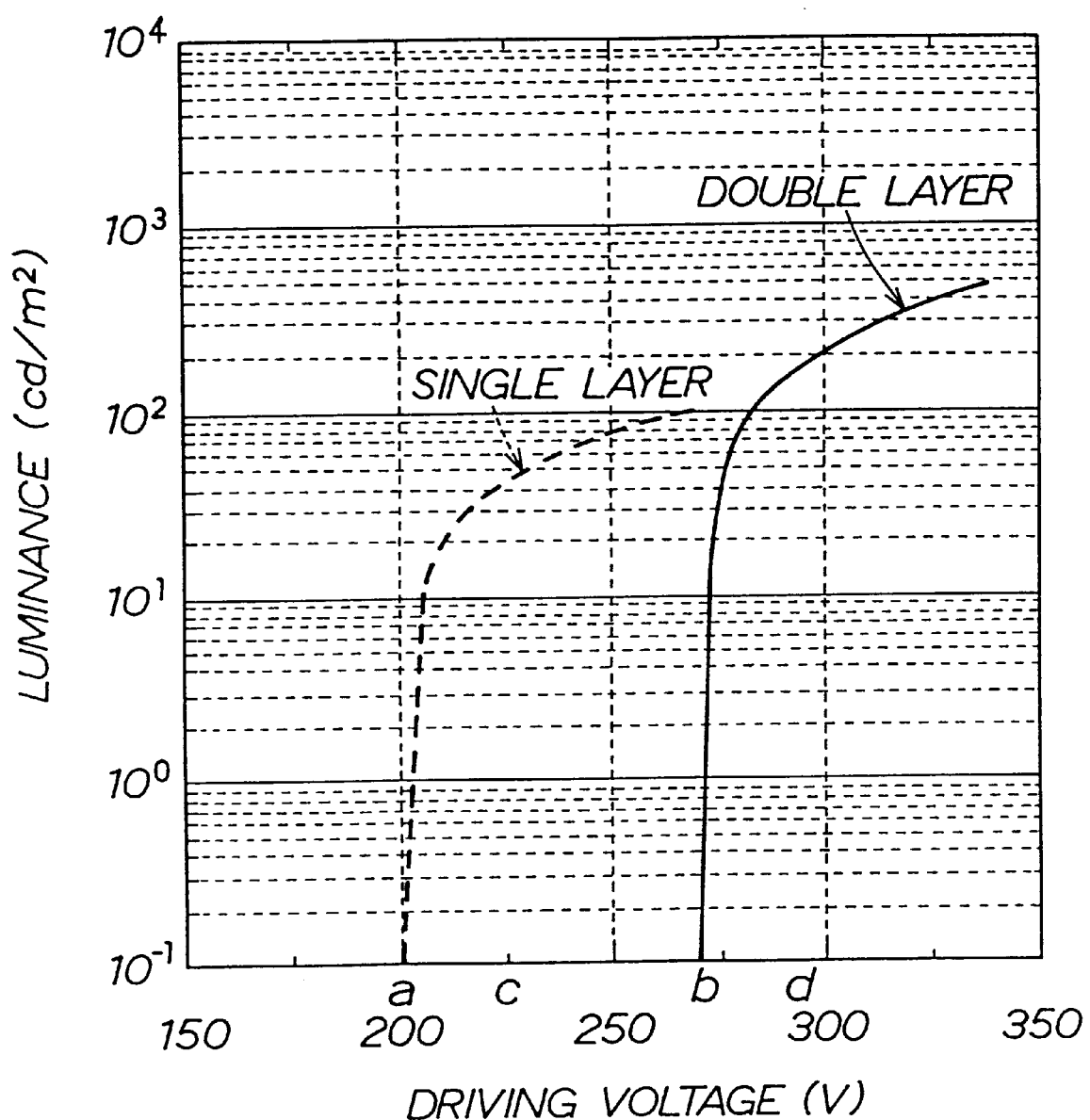
FIG. 3 is a graph showing relation between driving voltage and luminance in the first embodiment.

The relation between driving voltage and luminance for both of the single layer portion 10 and the double layer portion 20 is shown in FIG. 3. The single layer portion 10 starts to emit light when the driving voltage imposed between the first and second electrodes 2, 7 reaches its threshold voltage of 200.8 V (at point a), and its luminance rapidly increases as the driving voltage increases, as shown by a dotted line. The double layer portion 20 starts to emit light when the driving voltage reaches its threshold voltage of 273.4 V (at point b), and its luminance rapidly increases as the driving voltage increases, as shown by a solid line. At point c between points a and b, the luminance of the single layer portion 10 reaches a predetermined level of green light. At point d, the luminance of the double layer portion 20 reaches a predetermined level of lemon color light which is a mixture of green light from the first luminescent layer 4 and orange light from the second luminescent layer 5. A total luminance of the display panel is low at point c, and high at point d, because only the first luminescent layer 4 emits light at point c while both luminescent layers 4 and 5 emit light at the point d. The display panel is driven by the driving voltage at the vicinity of point c in night time, and at the vicinity of point d in day time. Therefore, images are displayed in green which is tender to driver's eyes in night time, while images are displayed in a lemon color having a high luminance to cope with sun light in day time.

Figure 4:
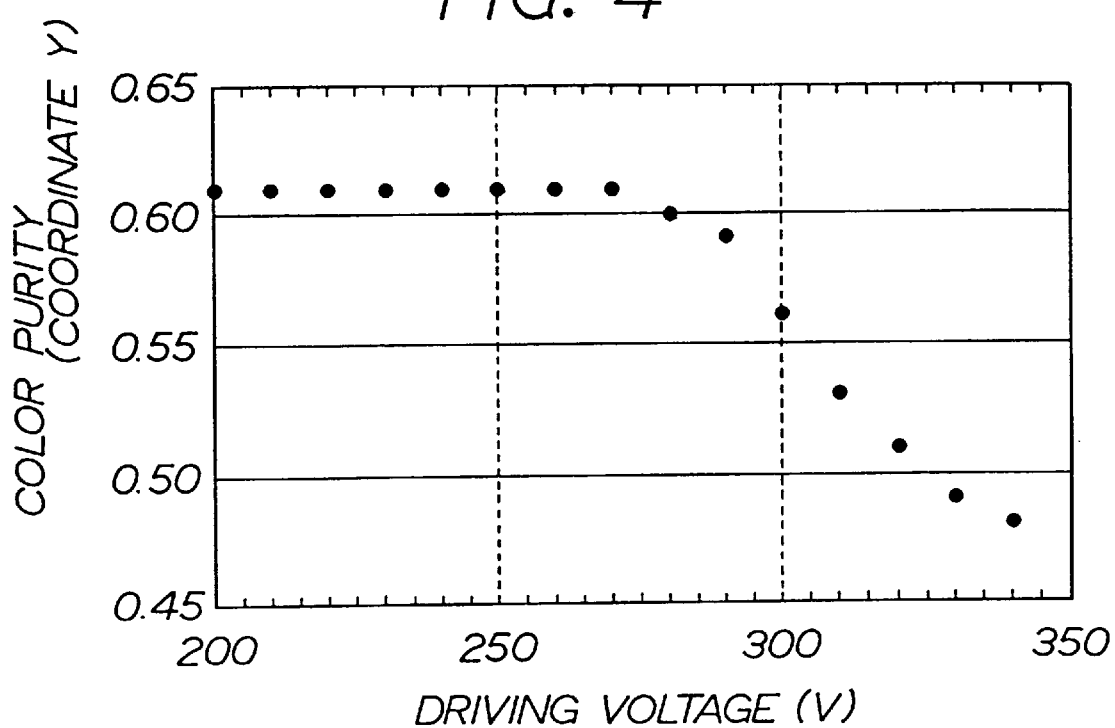
FIG. 4 is a graph showing relation between driving voltage and color purity in the first embodiment.

FIG. 4 shows relation between the driving voltage and color purity (coordinate Y). As seen in the graph, the color purity changes from 0.61 which represents green to 0.47 which represents yellow by sweeping the driving voltage from about 200 V to about 350 V. Thus, the display panel according to the present invention is able to change the display color only by changing the driving voltage. In addition, the color purity can be also changed by selecting the width of the second luminescent layer 5. For example, as the width of the second luminescent layer 5 becomes narrower, the display color changes from green to yellow-green only in a smaller range, because the display in green becomes predominant. On the other hand, the width of the second luminescent layer 5 is wider, the display 5 color changes from green to lemon in a wider range.

Figure 5:
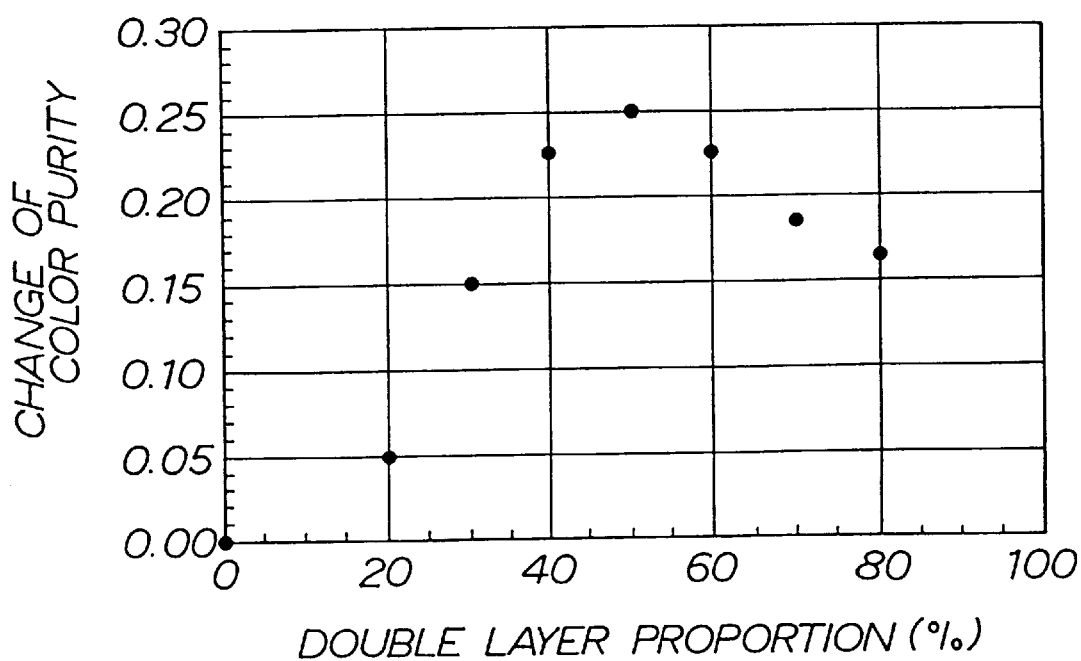
FIG. 5 is a graph showing relation between a double layer proportion to a pixel and change of color purity in the first embodiment.

FIG. 5 shows a range of color purity change when the double layer proportion to a pixel (one picture element) is changed. A ratio of the surface area of the double layer portion 20 to the surface area of the pixel (a double layer proportion) is shown on the abscissa, and a range of color purity change is shown on the ordinate. The range of color purity change is measured for samples each having a respective double layer proportion (0%–80%) by applying a driving voltage which is 40 V higher than the threshold voltage of the single layer portion (VthS) and another driving voltage which is 40 V higher than the threshold voltage of the double layer portion (VthD). As seen from the graph in FIG. 5, the range of color purity change is maximum when the double layer proportion is 50%. When the double layer proportion is 30% to 80%, the range of color purity change is higher than 0.15. If the range is higher than 0.15, the color change is clearly recognized by a viewer.

The color purity change can be also varied by changing the thickness of the second luminescent layer 5. For example, the color purity change becomes larger for a given range of the driving voltage when the thickness of the second luminescent layer 5 is made thinner, because the difference between threshold voltages VthD and TthS becomes smaller. On the contrary, as the thickness of the second luminescent layer 5 becomes thicker, the color purity change becomes smaller, because the difference between VthD and VthS becomes larger.

Now, manufacturing processes of the electromagnetic display panel described above will be briefly explained. An uniform ITO layer is formed on the glass substrate 1 by DC sputtering. The ITO layer is etched into stripes to form the first electrodes 2. Then, the lower layer 31 made of $SiO_xN_y$ and the upper layer 32 made of $Ta_2O_5$ containing 6 wt % of $Al_2O_3$ are formed on the first electrodes 2 by sputtering. More particularly, mixture gas containing Ar, $N_2$ and small amount of $O_2$ is introduced into a sputtering device, while keeping the glass substrate 1 therein at 300° C., and the mixture gas is kept at 0.5 Pa. The lower layer 31 is formed by 3 KW high frequency power using Si as a target. Then, the upper layer 32 is formed by 4 KW high frequency power, using Ar and $O_2$ kept at 0.6 Pa as a sputtering gas and a sintered compound target containing $Ta_2O_5$ and 6 wt % of $Al_2O_3$. Then, the first luminescent layer 4 made of ZnS as a mother material and TbOF as a luminescent center is formed uniformly on the upper layer 32. More particularly, the glass substrate 1 is kept at 250° C., Ar and He kept at 3.0 Pa are used as a sputtering gas, and 2.2 KW high frequency power is used for sputtering. Then, the second luminescent layer 5 made of ZnS as a mother material and Mn as a luminescent center is formed uniformly on the first luminescent layer 4. More particularly, the second luminescent layer 5 is formed by electron beam vapor deposition with a deposition speed of 0.1–0.3 nm/sec, while the glass substrate 1 is kept at a constant temperature in a vapor deposition device having a pressure lower than $5 \times 10^{-4}$ Pa. Then, the uniformly made layer is dry-etched into a plurality of stripes. The dry-etching is performed in an RIE device containing a mixture gas of Ar and $CH_4$ maintained under a pressure of 7 Pa, while keeping the glass substrate 1 at 70° C., by using 1 KW high frequency power. Then, the first and second luminescent layers 4, 5 are heat-treated under vacuum at a temperature of 400–600° C. Then, the lower layer 61 made of $Si_3N_4$, the middle layer 62 made of $Ta_2O_5$ containing 6 wt % of $Al_2O_3$, and the upper layer 63 made of $SiO_xN_y$ are formed on the luminescent layers 4, 5 in this order in the same manner as layers constituting the first insulation layer 3. However, the lower layer 61 made of $Si_3N_4$ is formed without using $O_2$ in the sputtering gas as opposed to the layer made of $SiO_xN_y$. Finally, the second electrodes 7 made of $ZnO:Ga_2O_3$ is formed uniformly on the upper layer 63 of the second insulation layer 6. The second electrodes 7 is formed by ion plating, using a pellet made of a mixture of ZnO powder and $Ga_2O_3$ as a deposition material. More particularly, the glass substrate 1 is kept at a constant temperature in an ion plating device containing Ar gas under a constant pressure. Beam power and high frequency power are controlled so that the deposition speed becomes in a range of 6–18 nm/min. The layer made uniformly is etched into a plurality of stripes. Thus, the electroluminescent display device shown in FIGS. 1 and 2 are completed.

Figure 6:
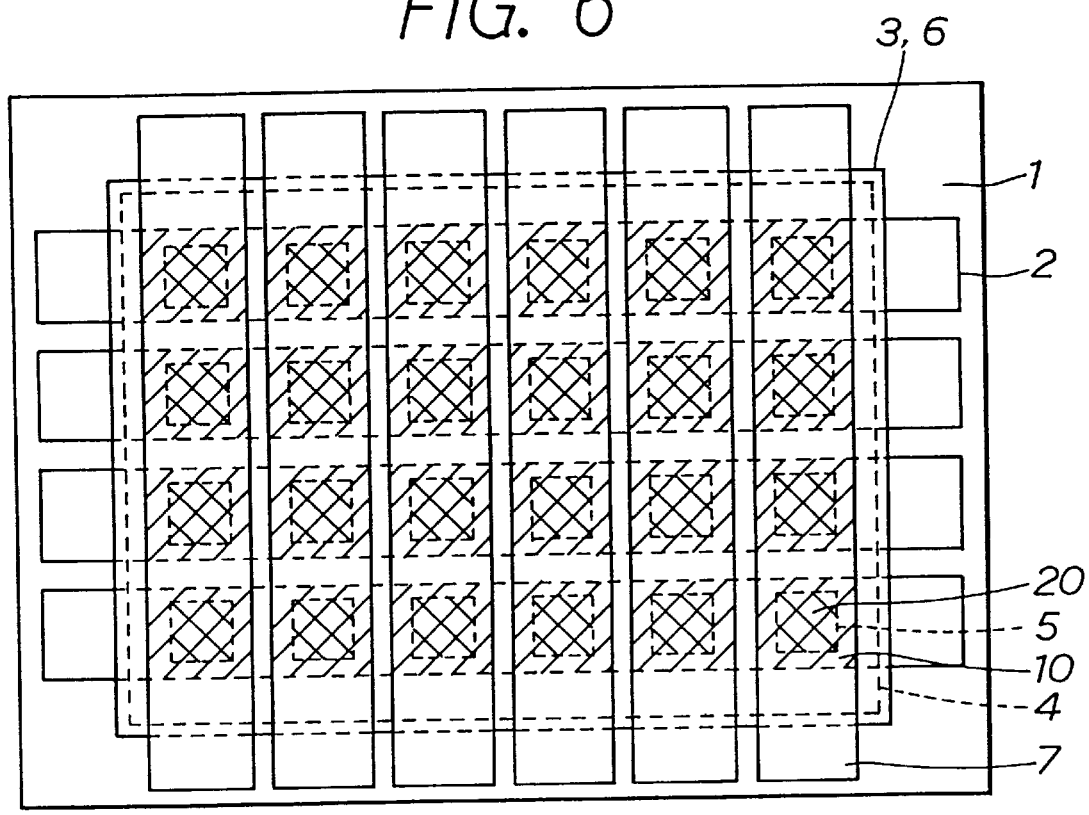
FIG. 6 is a plan view showing an electroluminescent display panel as a second embodiment of the present invention.

FIG. 6 shows a second embodiment of the present invention, in which the double layer portion 20 is made in a square shape, which is orthomorphic to the shape of the picture element, each square being separated from each other as opposed to a stripe shape in the first embodiment. The display will be more comfortable to a viewer, because both of the picture element and the double layer portion 20 are orthomorphic.

Figure 7:
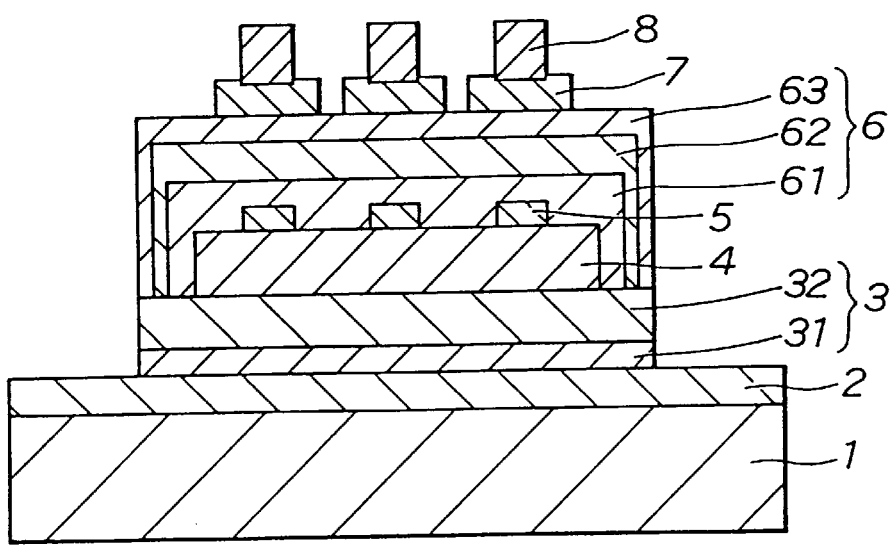
FIG. 7 is a cross-sectional view schematically showing an electroluminescent display panel as a third embodiment of the present invention.

FIG. 7 shows a third embodiment of the present invention, in which a red color filter 8 is additionally disposed on the second electrodes 7. Other structures are the same as those of the foregoing embodiments. Red light is emitted through the red color filter 8, though the double layer portion 20 emits lemon color light. When the display panel is driven at a high luminance, the light emitted from the panel is, as a whole, yellow which is a mixed color of green from the single layer portion 10 and red from the red color filter 8. The red color filter 8 may be replaced by other color filters such as a green or blue filter. It is also possible to dispose a color filter to match the single layer portion 10. For example, a blue color filter may be disposed on the second electrodes 7 to cover the single layer portion 10. In this case, the display color is blue at the low luminance and white, which is a mixed color of blue and yellow, at the high luminance.

Figure 8:
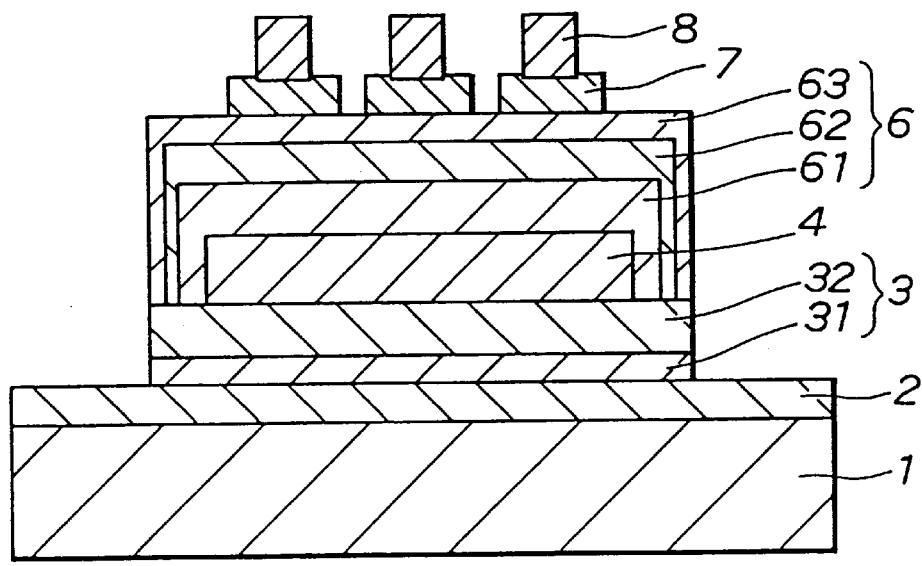
FIG. 8 is a cross-sectional view schematically showing an electroluminescent display panel as a fourth embodiment of the present invention.

FIG. 8 shows a fourth embodiment of the present invention, in which the second luminescent layer 5 of the third embodiment shown in FIG. 7 is eliminated. Other structures are the same as those of the foregoing embodiments. Red light is emitted through the red color filter 8 at the high luminance operation and green light is emitted from other portions not covered by the red color filter 8. Therefore, display color is green at the low luminance and yellow, which is a mixed color of green and red, at the high luminance. In place of the red color filter 8, other color filters may be used. For example, if a blue color filter is used, display color is green at the low luminance and blue-green at the high luminance.

Figure 9:
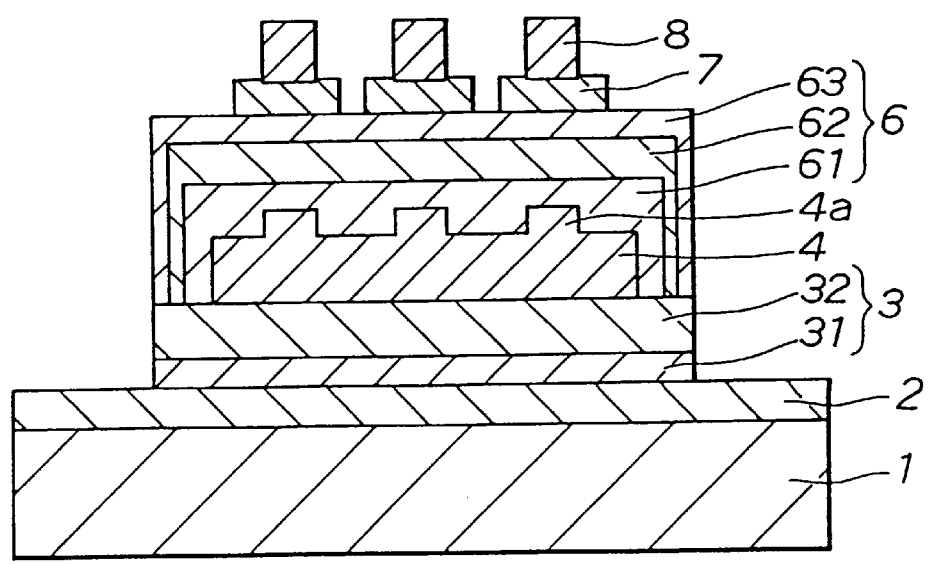
FIG. 9 is a cross-sectional view schematically showing an electroluminescent display panel as a fifth embodiment of the present invention.

FIG. 9 shows a fifth embodiment of the present invention, in which the first luminescent layer 4 of the fourth embodiment shown in FIG. 8 is modified. Other structures are the same as those of the foregoing embodiments. A plurality of thicker portions 4a are formed on the first luminescent layer 4. The red color filter 8 is disposed on the second electrodes 7 to cover the thicker portions 4a. The thicker portions 4a emit light having a higher luminance when a higher driving voltage is imposed. Therefore, luminance attenuation by the red color filter 8 can be compensated. The thicker portions 4a may be stripe-shaped or square-shaped. If they are square, a more comfortable display to a viewer will be realized as is done in the second embodiment.

The embodiments described above may be modified in various ways. For example, the material to be added as a luminescent center to the mother material ZnS in the first luminescent layer 4 is not limited to TbOF, but other materials such as $TbF_3$ or $TbCl_3$ may be used. Also, the material to be used as a luminescent center in the second luminescent layer 5 is not limited to Mn, but other materials such as $MnF_2$ or $MnCl_2$ may be used. The materials used for the first and second luminescent layers 4, 5 including the mother material in the first, second and third embodiments may be changed to other materials. For example, the first luminescent layer 4 may be made of SrS:Ce. In this case, blue-green light is emitted from the single layer portion 10. Similarly, the material used for the first luminescent layer 4 in the fourth and fifth embodiments may be changed to other materials which do not emit light including a red light component. In the embodiments having the red color filter 8, resin containing black pigment may be coated on the bottom surface of the glass substrate 1. By doing this, the red color filter 8 itself becomes difficult to be seen by a viewer, and accordingly the display becomes more natural. In addition, the red color filter 8 may be formed with a resist filter which is made by dispersing red dyestuff or pigment into organic solvent. Though the embodiments described above have a pixel matrix formed by the first and second electrodes both of which are stripe-shaped, the electrodes may be shaped in a certain pattern to realize a pattern display.

While the present invention has been shown and described with reference to the foregoing preferred embodiments, it will be apparent to those skilled in the art that changes in form and detail may be made therein without departing from the scope of the invention as defined in the appended claims.

What is claimed is:

1. An electroluminescent display panel comprising:

a pair of electrodes facing each other with a gap therebetween, the gap forming a picture element region;

a first luminescent layer disposed in the picture element region;

a second luminescent layer laminated on a part of the first luminescent layer, leaving a single layer portion and forming a double layer portion; and insulation layers disposed in the picture element region for insulating the first and second luminescent layers from the pair of electrodes, wherein:

both of the single layer portion and the double layer portion are driven by the same pair of electrodes;

the single layer portion starts emitting light when voltage imposed on the pair of electrodes reaches a first level; and the double layer portion starts emitting light when the voltage reaches a second level which is higher than the first level.

2. The electroluminescent display panel as in claim 1, wherein:

each of the pair of electrodes is a plurality of elongate stripes aligned in parallel to one another with a space therebetween;

the elongate stripes of one of the pair of electrodes extend perpendicularly to the elongate stripes of the other of the pair of electrodes, thereby forming a plurality of the picture element regions arranged in a matrix.

3. The electroluminescent display panel as in claim 1, wherein:

the first luminescent layer is made of ZnS which includes Tb; and the second luminescent layer is made of ZnS which includes Mn.

4. The electroluminescent display panel as in claim 1, wherein:

the first luminescent layer is made of a material which emits light including no visible red light components; and the second luminescent layer is made of a material which emits light including visible red light components.

5. The electroluminescent display panel as in claim 4, wherein:
a surface area proportion of the double layer portion to the picture element region is higher than 30 percent and lower than 80 percent.

6. The electroluminescent display panel as in claim 5, wherein:
a plane shape of the double layer portion is orthomorphic to a plane shape of the picture element region.

7. The electroluminescent display panel as in claim 1, further including a color filter disposed on an outside surface, opposite to the picture element region, of one of the pair of electrodes at a position corresponding to the double layer portion.

8. An electroluminescent display panel comprising:
a pair of electrodes facing each other with a gap therebetween, the gap forming a picture element region;
a luminescent layer disposed in the picture element region, the luminescent layer being made of a material which emits light including no visible red light components;
insulation layers disposed in the picture element region for insulating the luminescent layer from the pair of electrodes; and
a color filter disposed on an outside surface, opposite to the picture element region, of one of the pair of electrodes and having a width narrower than said one electrode, wherein a part of light emitted from the luminescent layer comes out through the color filter.

9. The electroluminescent display panel as in claim 8, wherein:
the luminescent layer includes a portion made thicker than other portions, a whole of the luminescent layer including the thicker portion being made of a same material; and
the color filter is disposed at a position corresponding to the thicker portion of the electroluminescent layer.

10. An electroluminescent display panel comprising:
a glass substrate;
a first electrode layer laminated on the glass substrate;
a first insulation layer laminated on the first electrode layer;
a first luminescent layer laminated on the first luminescent layer and made of ZnS:TbOF;
a first luminescent layer laminated on the first luminescent layer and made of ZnS:Mn, covering a part of the first luminescent layer and forming a double layer luminescent portion and a single layer luminescent portion;
a second insulation layer laminated on and covering the double layer luminescent portion and the single layer luminescent portion; and
a second electrode layer laminated on the second insulation layer, wherein:
both of the signal layer luminescent portion and the double layer luminescent portion are driven by the same electrodes;
the single layer luminescent portion emits a light at a first level of voltage commonly imposed on the single and double layer luminescent portions by the first and second electrode layers; and
the double layer luminescent portion emits light at a second level of voltage higher than the first level of voltage commonly imposed on the single and double layer luminescent portions by the first and second electrode layers.

* * * * *